(12) United States Patent
Crow et al.

(10) Patent No.: US 7,554,546 B1
(45) Date of Patent: *Jun. 30, 2009

(54) STIPPLED LINES USING DIRECT DISTANCE EVALUATION

(75) Inventors: Franklin C. Crow, Portola Valley, CA (US); Douglas A. Voorhies, Menlo Park, CA (US); John M. Danskin, Cranston, RI (US)

(73) Assignee: NVIDIA Corporation, Santa Clara, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 11/735,041

(22) Filed: Apr. 13, 2007

Related U.S. Application Data (63) Continuation of application No. 10/742,558, filed on Dec. 18, 2003, now Pat. No. 7,221,368.

(51) Int. Cl.
*G06T 11/20* (2006.01)

(52) U.S. Cl. .................................................. 345/441

(58) Field of Classification Search .................. 345/441
See application file for complete search history.

(56) References Cited

U.S. PATENT DOCUMENTS 7,221,368 B1 * 5/2007 Crow et al. .................. 345/441

* cited by examiner

*Primary Examiner*—Javid A Amini
(74) *Attorney, Agent, or Firm*—Townsend and Townsend and Crew LLP (57) ABSTRACT

Stippled lines are drawn by evaluating a distance function for a set of points within the area of a stippled line. The distance function gives a distance value proportional to the distance from a point to the end of the stippled line. Using the point's distance value, a pattern index value defines a correspondence between a point and at least one stipple pattern bit. The value of pattern bits are applied to the points on the stippled line, masking the points such that only a portion of the set of points are displayed or determining intensity values according to the position of the points within the stipple pattern. A distance function may be an edge equation associated with the line end or a segment of a polyline. The distance function can be evaluated for the set of points in any order, allowing portions of a stippled line to be drawn in parallel.

27 Claims, 7 Drawing Sheets

STIPPLED LINES USING DIRECT DISTANCE EVALUATION

CROSS-REFERENCES TO RELATED APPLICATIONS

This application is a continuation of U.S. application Ser. No. 10/742,558, filed Dec. 18, 2003, which is incorporated herein by reference in its entirety for all purposes.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Rendered images can include both two-dimensional and three-dimensional components. For example, many computer-aided design (CAD) applications will display three-dimensional objects overlaid with two-dimensional annotations. Two dimensional annotations can include stippled or patterned lines associated with portions of the three-dimensional objects. Unlike "solid" lines, in which all the pixels on the line are turned "on," the pixels on a stippled line turn on and off according to a repeating "stipple" pattern associated with the line. Stippled lines can include any combination of "dotted" and "dashed" line patterns.

Stippled lines are often used to convey additional information about the two- or three-dimensional information. For example, in drafting applications, lines can be used to display dimensioning information, rotational axis, and assembly relationships. Other types of applications can use lines to convey other types of information about three-dimensional objects. The use of stippled lines and the patterns associated with them can be specified by user preferences, the application, or drafting or technical standards related to the field of application use.

Complex two-dimensional annotations may include hundreds or thousands of stippled lines. Moreover, some applications create animations of two- or three-dimensional information including stippled lines. In addition, curved lines are generally made up from short straight line segments (forming "polylines"), increasing the count by tenfold, even a hundred-fold. Therefore, it is important for graphics processing subsystems to draw stippled lines as efficiently as possible.

One prior method for drawing stippled lines follows the length of the stippled line from one endpoint to another, iteratively cycling through the stipple pattern and turning pixels on or off accordingly. As the stippled line must be drawn in order from one endpoint to another, rather than the order that the graphics processing subsystem normally rasterizes pixels, drawing performance is greatly reduced. Alternatively, separate hardware for drawing lines must be included, complicating the design and expanding the size of the chip. Additionally, many graphics processing subsystems have multiple rasterization pipelines running in parallel to increase drawing performance. However, because the pattern value of a pixel on the stippled line depends on the pattern value determined for the previous pixel, this method for drawing stippled lines cannot be parallelized for optimal execution by graphics processing subsystem.

It is therefore desirable to have a system and method for drawing stippled lines efficiently and in any order required by the rasterizer for optimal performance. It is further desirable to be able to parallelize drawing stippled line over multiple rasterization pipelines. Additionally, it is desirable to draw antialiased stippled lines. Furthermore, when drawing stippled polylines, which are connected groups of stippled line segments, it is desirable to preserve stipple pattern phase information between polyline segments, so that the stipple pattern transitions smoothly. Moreover, it is desirable to be able to efficiently scale stipple patterns along a stippled line.

BRIEF SUMMARY OF THE INVENTION

An embodiment of the invention draws stippled lines by evaluating a distance function for a set of points within the area of a stippled line. The distance function gives a distance value proportional to the distance from a point to the end of the stippled line. Using the point's distance value, a pattern index value is derived to define a correspondence between a point and at least one stipple pattern bit. The values of pattern bits are applied to the points on the stippled line, masking the points such that only a portion of the set of points are displayed or determining intensity values according to the position of the points within the stipple pattern. A distance function may be an edge equation associated with the line end or a segment of a polyline. The distance function can be evaluated for the set of points in any order, improving the performance in drawing stippled lines.

In an embodiment, a method for drawing a stippled line comprises determining a distance function associated with the stippled line and evaluating the distance function for a set of points within the area of the stippled line to determine a corresponding set of distance values. The embodiment determines a set of stipple pattern index values for the set of points. Each stipple pattern index value specifies a correspondence between at least one pattern bit of a stipple pattern and one of the set of points within the area of the stippled line. The values of the pattern bits of the stipple pattern specified by the set of stipple pattern index values are applied to the corresponding ones of the set of points to determine a set of point values for the set of points.

In a further embodiment, determining a distance function includes determining an edge equation associated with an end of the stippled line, such that a value of the edge equation at a point is proportional with the distance from the point to the end of the line. The edge equation may be scaled such that the value of the edge equation at a point is the distance from the point to the end of the line in terms of pattern bits of the stipple pattern. In another embodiment, the edge equation is further scaled by a pattern scaling factor to alter an apparent length of the stipple pattern.

In an embodiment, the edge equation provides the distance to the end of the stippled line. In an additional embodiment, the edge equation provides the distance to the end of a line segment of the stippled line and the distance function further includes a phase offset value specifying the position in the repeating stipple pattern due to the distance along the stippled line from the end of the stippled line to the end of the line segment.

In an additional embodiment, determining a distance function includes determining a set of tiles each potentially including at least a portion of the stippled line and determining a first edge equation associated with an end of the stippled line. For each one of the set of tiles, this embodiment determines a tile edge equation associated with the first edge equation. Each tile edge equation is associated with a distance value specifying the distance along the stippled line from the end of the stippled line to the tile position or a phase offset value specifying the position in the repeating stipple pattern due to the distance from the end of the stippled line. In a further embodiment, the corresponding set of distance values are expressed as a set of fixed point numbers. The set of tiles each have a size chosen such that the corresponding set of distance values fall within the range of the set of fixed point numbers.

BRIEF DESCRIPTION OF THE DRAWINGS

The invention will be described with reference to the drawings, in which.

DETAILED DESCRIPTION OF THE INVENTION

Figure 1:
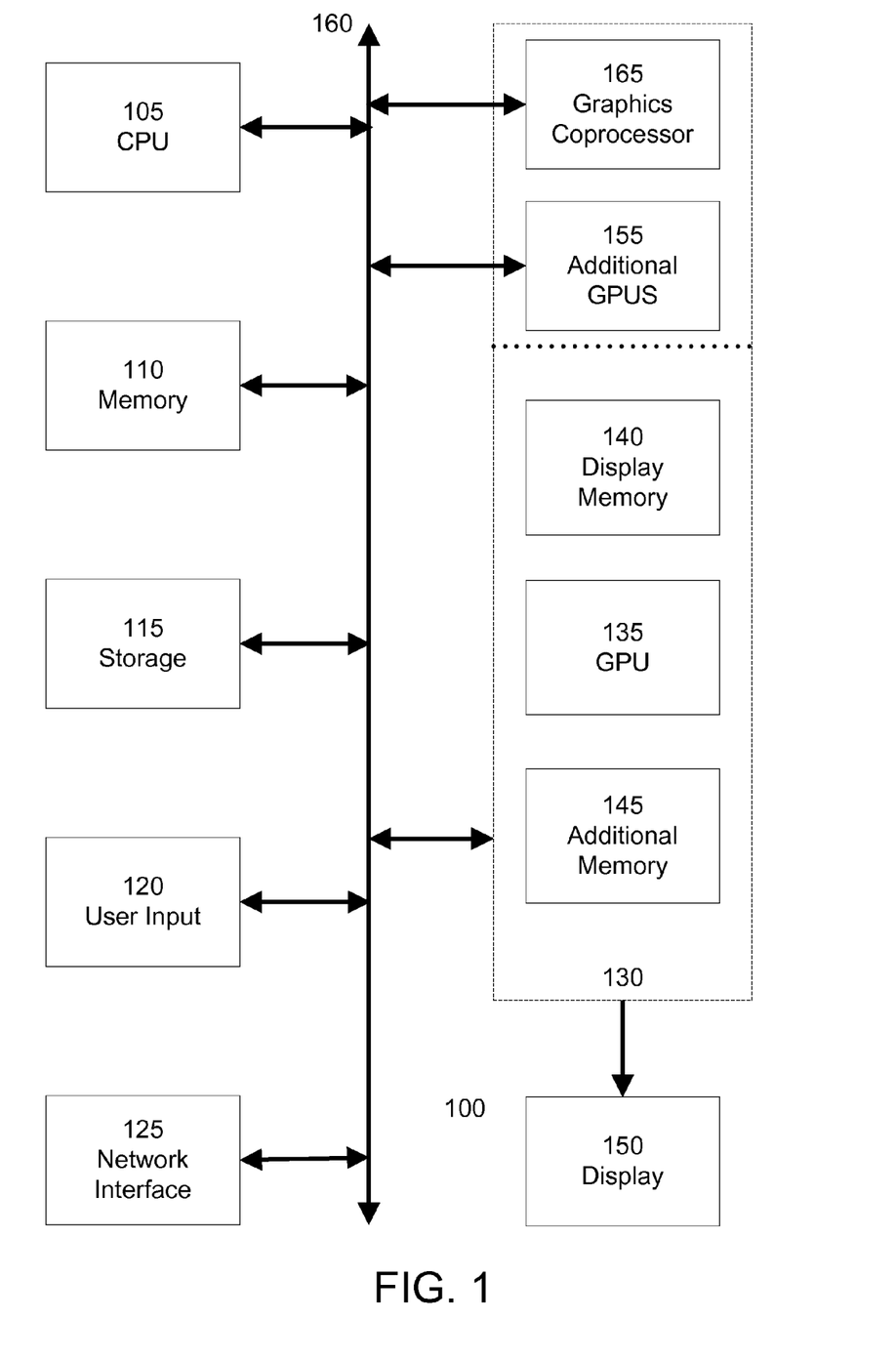
FIG. 1 is a block diagram of a computer system suitable for practicing an embodiment of the invention.

FIG. 1 is a block diagram of a computer system 100, such as a personal computer, video game console, personal digital assistant, cell phone, or other digital device suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory or other solid-state devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X (also known as 3GIO), and HyperTransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and are shared with the CPU 105. Alternatively, display memory 140 and/or additional memory 145 are one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays, and other light-emitting and light modulating technologies. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same integrated circuit, module, chip package, or circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip, or other device used to control the data bus 160.

Figure 2:
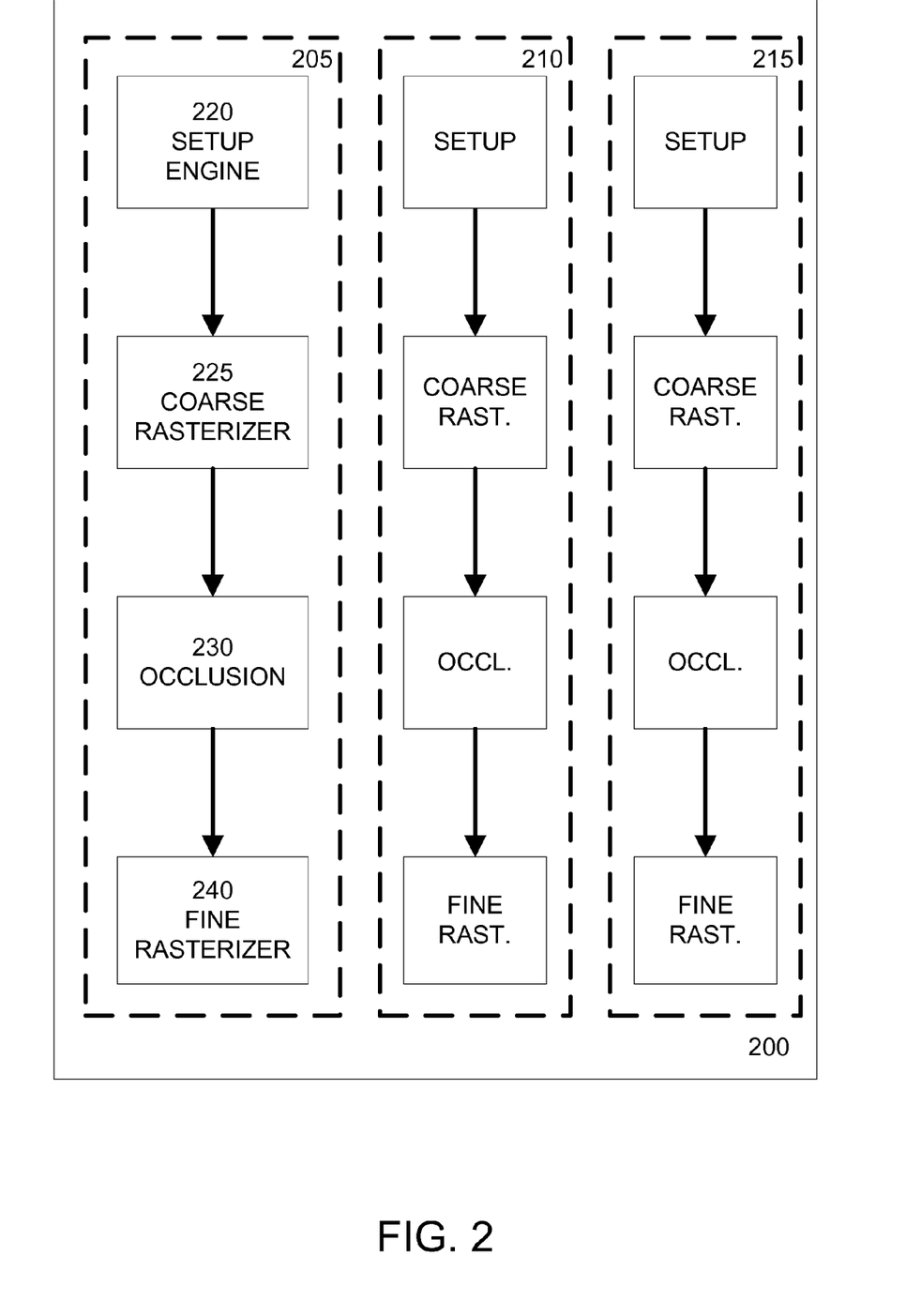
FIG. 2 is a block diagram illustrating a rasterizer portion of a graphics processing unit suitable for implementing an embodiment of the invention.

FIG. 2 is a block diagram illustrating a rasterizer portion 200 of a graphics processing unit, for example GPU 135, suitable for implementing an embodiment of the invention. Rasterizer portion 200 is responsible for converting geometric primitives defined by rendering commands and data into a set of pixels. Rasterizer portion 200 includes at least one rasterizer pipeline 205. In an embodiment, rasterizer portion 200 includes additional independent rasterizer pipelines operating in parallel, for example rasterizer pipeline 210 and 215. Rasterizer portion 200 can include any number of rasterizer pipelines operating in parallel to improve the performance of the graphics processing unit.

A typical rasterizer pipeline, such as rasterizer pipeline 205, includes a setup engine 220. Setup engine 220 receives rendering commands and data defining geometric primitives from other portions of the graphics processing unit. From the rendering commands and data, the setup engine 220 determines edge equations defining the boundaries of a geometric primitive. For a triangular geometric primitive, the setup engine 220 determines three edge equations defining the boundary of the primitive. For a quadrilateral geometric primitive, the setup engine 220 determines four edge equations defining the boundaries of the primitive.

In an embodiment, the rasterizer portion 200 defines lines, including stippled lines, as quadrilateral geometric primitives having a very narrow width. In this embodiment, setup engine 220 determines four edge equations for a line, of which, two edge equations define the sides of the line and two edge equations define the ends of the line.

Coarse rasterizer 225 receives the edge equations from the setup engine 220 and determines portions of the output image potentially inside the boundaries defined by the edge equations. In an embodiment, coarse rasterizer 225 divides the output image into a set of uniform square or rectangular tiles of pixels and determines a subset of tiles potentially inside the boundaries defined by the edge equations. For example, one implementation of the coarse rasterizer 225 divides the output image into tiles of 8 by 8 pixels. In another embodiment, coarse rasterizer 225 is omitted from rasterizer portion 200, or alternately combined with fine rasterizer 240, discussed below.

Occlusion unit 230 receives the subset of tiles from coarse rasterizer 225 and determines if any of the tiles are wholly occluded in the output image, for example by previously rasterized geometric primitives. Occlusion unit 230 removes wholly occluded tiles from the subset of tiles and passes the remaining portion of the subset of tiles to fine rasterizer 240. In an embodiment, the subset of tiles associated with a line are not occluded in the output image; thus, occlusion unit 230 in this embodiment passes the subset of tiles to fine rasterizer 240 unchanged. In an alternate embodiment, occlusion unit 230 is omitted from rasterizer portion 200.

Fine rasterizer 240 determines the pixels, if any, in each tile inside the boundaries defined by the edge equations of the geometric primitive. For edge equations associated with a line, the fine rasterizer outputs a set of pixels on the line. A stippled line will include a set of pixels having on or off values according to the stipple pattern associated with the line. In an embodiment, the set of pixels of an aliased stippled line have pixel values of one of two values, for example "0" or "1", according to the stipple pattern. In another embodiment, each pixel of an antialiased stippled line has a range of values, which represent the proportion of each pixel covered by the "on" portion of a stipple pattern associated with a stippled line. In one implementation, the set of pixels of an antialiased stippled line are represented by 5-bit "alpha" values. Alternatively, alpha values are represented by numbers of any length or format, including fixed-point and floating point formats. The alpha values blend the color value of the stippled line with the color value from other geometric primitives at the same pixel.

Figure 3:
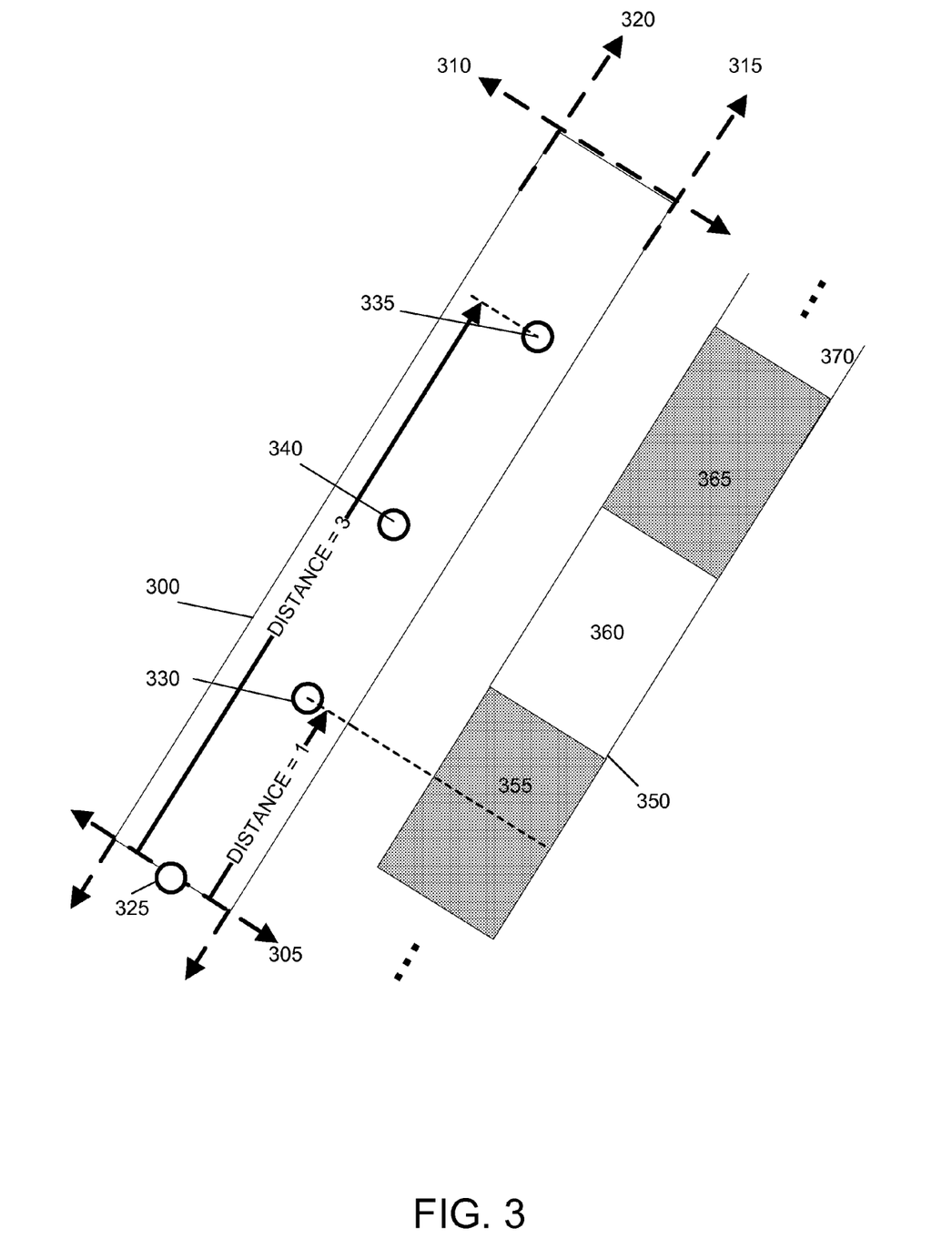
FIG. 3 illustrates an example stippled line drawn according to an embodiment of the invention.

FIG. 3 illustrates an example stippled line drawn according to an embodiment of the invention. As discussed above, stippled lines can be defined by four edge equations, such as edge equations 305 and 310 defining the ends of stippled line 300 and edge equations 315 and 320 defining sides of stippled line 300.

In an embodiment, an edge equation can be expressed as $A(y-y_0)+B(x-x_0)=0$ or as $A(y)+B(x)+C=0$. In either form, the expression $A(y-y_0)+B(x-x_0)$ or $A(y)+B(x)+C$ will give a value proportional to the distance from point (x,y) to the line for any given values of (x,y). Furthermore, an edge defined by the edge equation will be unchanged as the values of A and B are scaled, provided the ratios between these parameters are unchanged. Applying these principles, the values of A and B for an edge equation defining the end of a stippled line can be scaled so that the expression $A(y-y_0)+B(x-x_0)$ gives a perpendicular distance value, in terms of pixels of the stipple pattern, from any point (x,y) to the end of the line. Similarly, the values of A, B and C can be scaled so that the expression $A(y)+B(x)+C$ gives a perpendicular distance value, in terms of pixels of the stipple pattern, from any point (x,y) to the end of the line.

In FIG. 3, the values of A, B, and C for the edge equation associated with edge 305 have been scaled so that the expression $A(y)+B(x)+C$ gives the distance value from edge 305 to any point, including points on stippled line 300. Alternatively, FIG. 3 can use the expression $A(y-y_0)+B(x-x_0)$, with the values of A and B scaled to give the distance value from edge 305 to any point, including points on stippled line 300. For example, pixel 325, which is on edge 305, has a distance value of zero. Evaluating the position of pixel 330 in the scaled expression associated with edge 305 gives a distance of one from edge 305 to pixel 330, in terms of pixels of the stipple pattern. Similarly, pixel 335 has a distance of three from edge 305.

In an embodiment, the distance values determined from the scaled edge equation for pixels on the line 300 correspond with the pixels of the stencil pattern 350. Stencil pattern 350 includes a number of pattern bits, such as pixels 355, 360, 365, and 370. In an embodiment, stipple pattern bits have one of two values, corresponding with portions of the stippled line either on or off. In OpenGL, a stipple pattern may be expressed as a 16-bit value, wherein each bit corresponds to the value of a stipple pattern bit. For stippled lines longer than the stipple pattern, the stipple pattern is repeated.

For stippled line 300, pixel 330, having a distance of one from edge 305, corresponds with pattern bit 355 of stipple pattern 350, and therefore is turned off in accordance with the stipple pattern 350. Similarly, pixel 335, having a distance of three from edge 305, corresponds with pixel 365 and is also turned off. Pixel 340 corresponds with pattern bit 360 and is turned on. Because the distance from edge 305 to each pixel can be determined directly from the scaled edge equation, the pixels of stippled line 300 can be evaluated in any order. Hence, the pixels of the stippled line can be drawn in any order.

Figure 4:
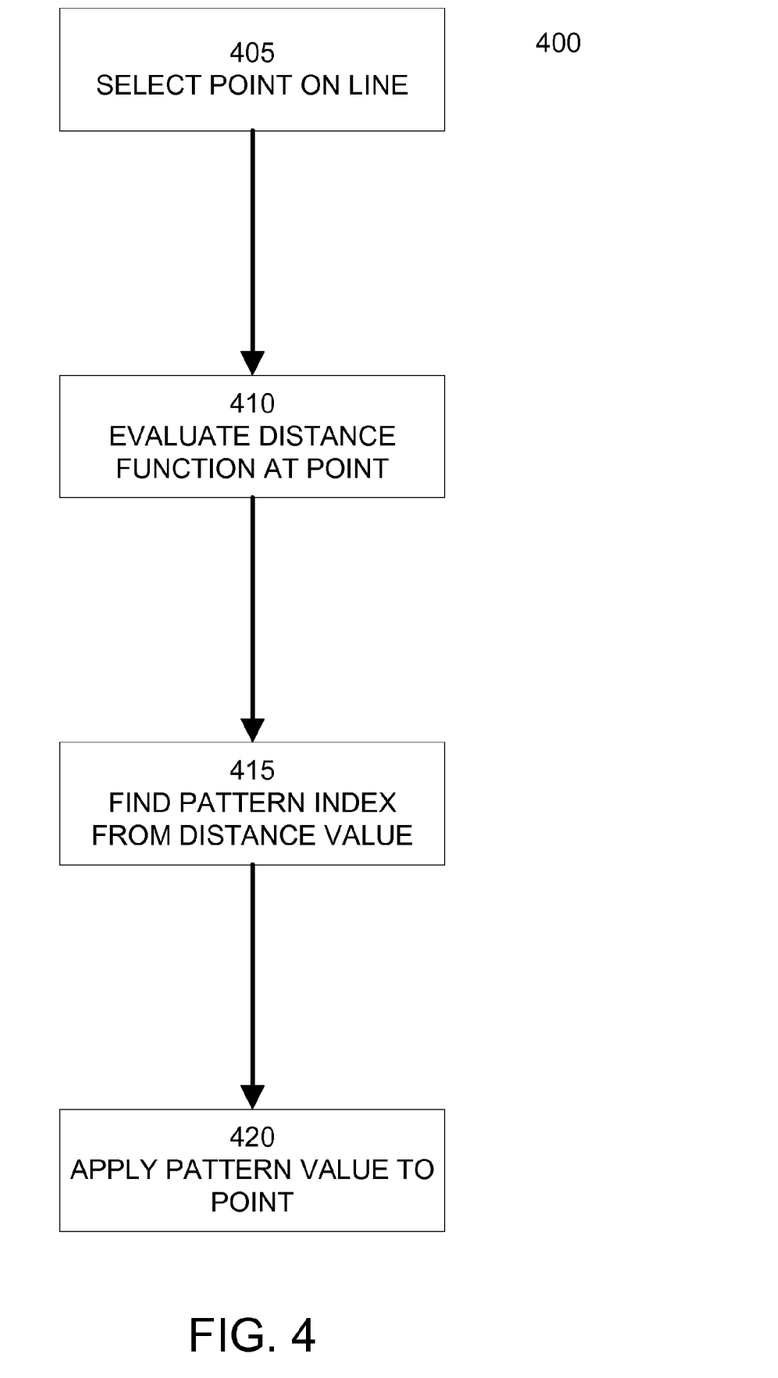
FIG. 4 illustrates a method for drawing a stippled line according to an embodiment of the invention.

FIG. 4 illustrates a method 400 for drawing a stippled line according to an embodiment of the invention. At step 405, a point on the stippled line is selected for drawing. In an embodiment, a point on the stippled line corresponds with a pixel wholly or partially within the boundaries of the stippled line as defined by the edge equations. In another embodiment, a point corresponds with a sub-pixel sample within the boundaries of an antialiased stippled line as defined by the edge equations.

As discussed above, points on the stippled line can be drawn in any order. In an embodiment, a point is selected in step 405 according to the rasterization order of the graphics processing unit. For example, if the rasterizer portion of the graphics processing unit rasterizes geometric primitives from the top of the screen to the bottom of the screen, then step 405 selects points on the stippled line from top to bottom, regardless of the direction of the stippled line or the location of its endpoints. In a further embodiment, two or more rasterization pipelines perform the method 400 in parallel for different points on the stippled line.

At step 410, a distance function is evaluated for the coordinates of the selected points. In an embodiment, the distance function is an edge equation associated with an end of the stippled line, such that the value of the distance function evaluated for the point is proportional to the distance from the end of the stippled line. In an embodiment, the edge equation used as a distance function is scaled such that the value of the distance function is the distance in pattern bits from the point to the end of the stippled line. In a further embodiment, a pattern scaling factor is further applied to the distance function to "stretch" or "squash" the stipple pattern applied to the stippled line. For example, if the pattern scaling factor is one-half, distance values will be halved causing the stipple pattern to be "stretched" to twice its normal length along the line.

Step 415 determines a stipple pattern index value from the value of the distance function at the selected point. A stipple pattern index value specifies one or more pattern bits from the stipple pattern corresponding with the selected point of the stippled line. In an embodiment, a stipple pattern has a fixed length. For example, a graphics API such as OpenGL specifies a stipple pattern length of sixteen. However, other implementations may allow for stipple patterns of any arbitrary length.

For stippled lines longer than the stipple pattern, an embodiment repeats the stipple pattern along the entire length of the stippled line. In this embodiment, the stipple pattern index value is the remainder of the division of the distance function value by the length of the stipple pattern, or stated equivalently, the distance function modulo the stipple pattern length. For example, if the distance value for a point is 37 and the pattern length is 16, then the pattern index value would be 5. In another embodiment, the pattern length is a power of two, allowing the pattern index value to be determined using a bit shift and mask operation. In a further embodiment, a pattern index value includes a fraction of a whole number, indicating that a point of the stippled line corresponds in part with multiple adjacent pattern bits.

Step 420 uses the stipple pattern index to determine the value of the selected point. In an embodiment, the stipple pattern index is used to look up the value of a corresponding pattern bit in the stipple pattern. Continuing with the above example, if the pattern index value is 5, then the value of the fifth pattern bit in the stipple pattern is applied to the selected point. In an embodiment, the value of the pattern bit selectively masks the point on the stippled line to form the stipple pattern. In this embodiment, the pattern bit specifies whether the point on the stippled line should be off or on. Line attributes such as line color and transparency are then later applied to the points on the stippled line having an "on" value according to the stipple pattern. In another embodiment, the line attributes are supplied directly in the pixel pattern.

In another embodiment, points on the stippled line are antialiased according to their positions within the stipple pattern. In this embodiment, step 420 assigns an intensity or alpha value to the point based upon its position relative to adjacent pattern bits. The value assigned to the pixel may be a weighted average of the values of the adjacent pattern bits. For example, a point halfway between an "on" value and an "off" value in the stipple pattern will be assigned an intensity or alpha value halfway between an "on" and an "off" state. When line attributes such as line color are applied to the antialiased point, the point will have a color value halfway between the line color and the background color. In a further embodiment, the intensity value assigned to a point may be related to its position within the stipple pattern by another function, such as a non-linear function. In an embodiment, the alpha value is a 5-bit number. Alternatively, alpha values are represented by numbers of any length or format, including fixed-point and floating point formats.

It should be noted that the antialiasing of points on the stippled line according to their positions within the stipple pattern is separate from antialiasing of points based on their position within the boundary of the stippled line. In a further embodiment, points on the stippled line are antialiased according to both their positions within the stipple pattern and their positions within the boundaries of the stippled line.

Figure 5:
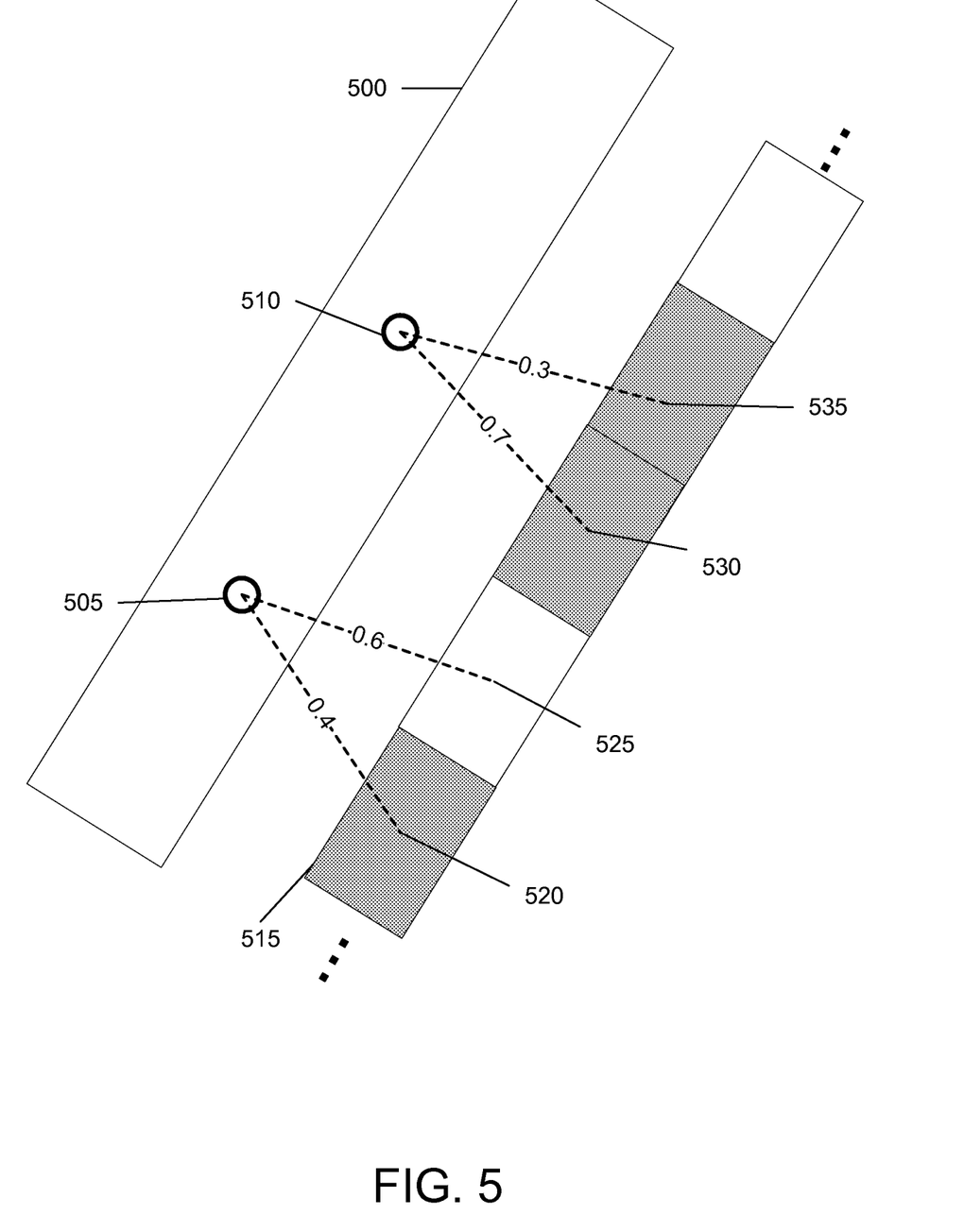
FIG. 5 illustrates the application of antialiasing to points on a stippled line with respect to their positions within the stipple pattern according to an embodiment of the invention.

FIG. 5 illustrates the application of antialiasing to points on a stippled line 500 according to their positions within the stipple pattern. Stippled line 500 includes points 505 and 510. In this example application, the pattern index for point 505 is determined to be 1.6, which corresponds with pattern bits 520 and 525. Based on the pattern index value, the value of point 505 is the weighted average of 0.4 times pattern bit 520 and 0.6 times pattern bit 525.

Similarly, the pattern index for point 510 is determined to be 3.3. The value of point 510 is the weighted average of 0.7 times pattern bit 530 and 0.3 times pattern bit 535. However, as pattern bits 530 and 535 both have the same value, computing a weighted average for the value of the point 510 is redundant in this example. In a further embodiment, points corresponding with pattern bits of different values are antialiased as described above, while points corresponding with pattern bits of the same value are assigned the value of either corresponding pattern bit.

In an embodiment, fixed-point numbers are used to evaluate points in the edge equation to determine the distance value of a point. A fixed point number uses a predetermined number of bits to express the whole portion of a number and the remaining bits to express the fractional portion of the number. For example, a 16-bit fixed point number may have 4 bits to express the whole portion of a number and the remaining 12 bits to represent the fractional portion. For a given bit length, or word size, fixed point numbers allow for increased numerical precision in calculations compared with integer numbers, at the cost of a decreased numerical range.

Figure 6:
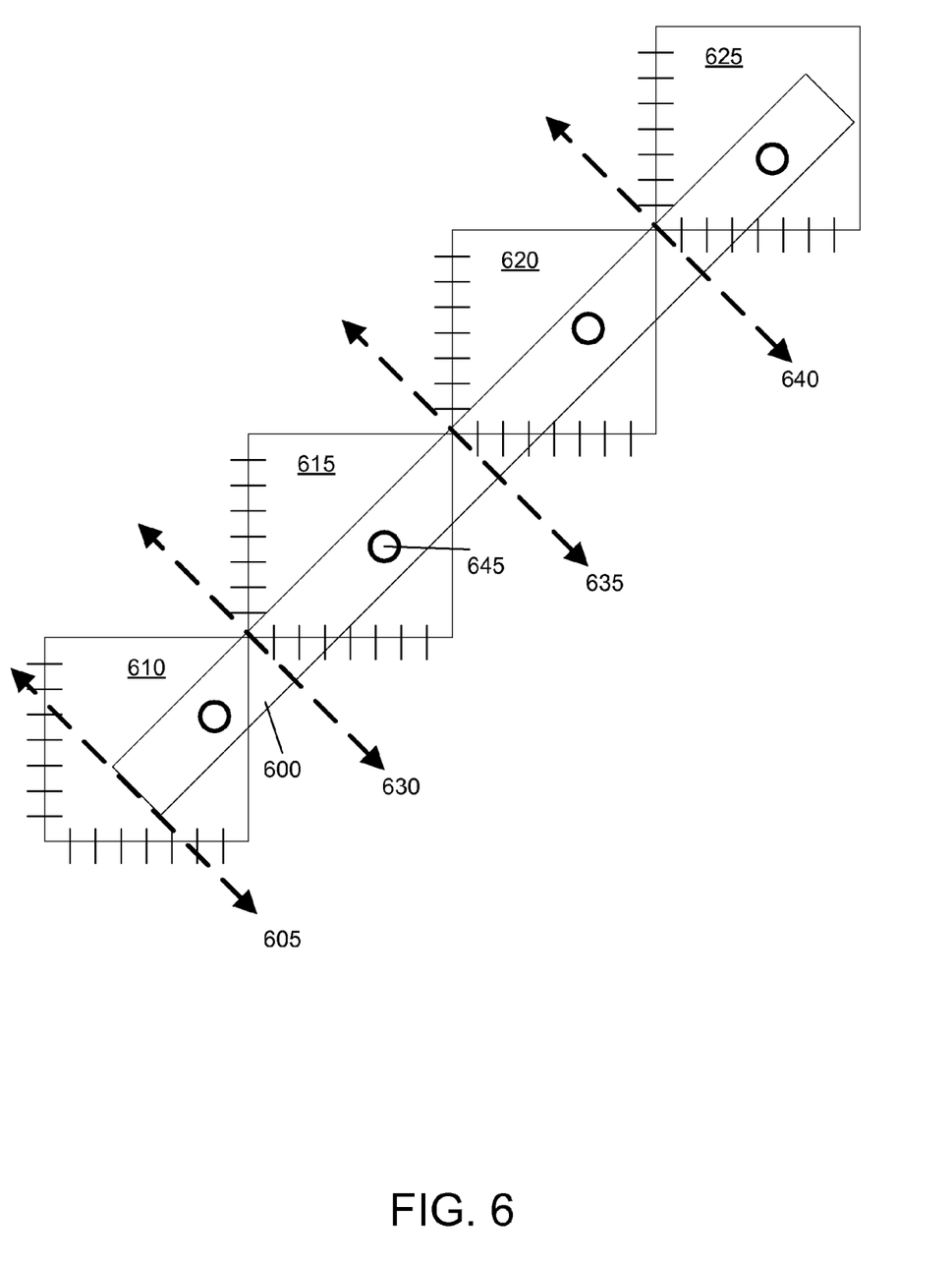
FIG. 6 illustrates determining a stipple pattern value for a point on a stippled line according to another embodiment of the invention.

To allow the use of shorter word lengths to save chip area, an embodiment of the invention uses a set of tiles to limit the range of the distance values determined for points on the stippled line. FIG. 6 illustrates determining a stipple pattern value for a point on a stippled line 600 according to this embodiment of the invention.

Stippled line 600 includes an edge equation 605 associated with its end. To limit the range of distance values, a set of tiles, including tiles 610, 615, 620, and 625, are overlaid on the stippled line. In an embodiment, the set of tiles correspond with the tiles determined by a coarse rasterizer 225 discussed above with respect to FIG. 2. In one implementation of this embodiment, each tile represents an 8-by-8 pixel region of the output image. However, the only limitation on the tile size is the requirement that the distance across the diagonal of the tile is less than the maximum range allowed by the fixed point number used to express the distance of a point from an edge.

For each tile, an edge equation is a determined for the portion of the stippled line inside of the tile. In an embodiment, the edge equation for a tile is determined by adding a position offset to the edge equation 605 associated with the end of the stippled line. For example, tile 610, which includes the end of stippled line 600, has an edge equation 605. An edge equation 630 is determined for tile 615 by adding a position offset to edge equation 605. Similarly, edge equations 635 and 640 are determined for tiles 620 and 625, respectively, by adding position offsets to the edge equation 605 or the edge equation of another tile, for example, the edge equation of tile 610 or 615.

Additionally, a phase offset value is determined for each tile. The phase offset value is the modulo division of the distance from the edge associated with the end of the stippled line to the edge associated with a tile by the pattern length. For example, the phase offset value of tile 620 is the remainder of the distance from edge 635 to edge 605 divided by the pattern length.

To determine a pattern bit value for a point on the stippled line within a tile, the point is evaluated in the edge equation associated with the tile to determine a distance value. The phase offset value is added to the distance value and the sum is divided by the pattern length. The remainder of this operation is the pattern index for the point. The value of one or more pattern bits is then applied to the point as described above to determine an aliased or antialiased point value.

For example, point 645 is evaluated in edge equation 630 to determine a distance value. The phase offset of tile 615 is added to the distance value for point 645, and the sum is divided by the pattern length. The remainder is a pattern index value for point 645.

As with other embodiments of the invention, the points on the stippled line can be evaluated in any order, allowing the drawing of stippled lines to be parallelized to maximize drawing performance. In an embodiment, tiles having different portions of the stippled line can be drawn in parallel using different rasterization pipelines of a graphics processing unit. This allows stipple line performance to scale linearly with the number of independent rasterization pipelines.

Figure 7:
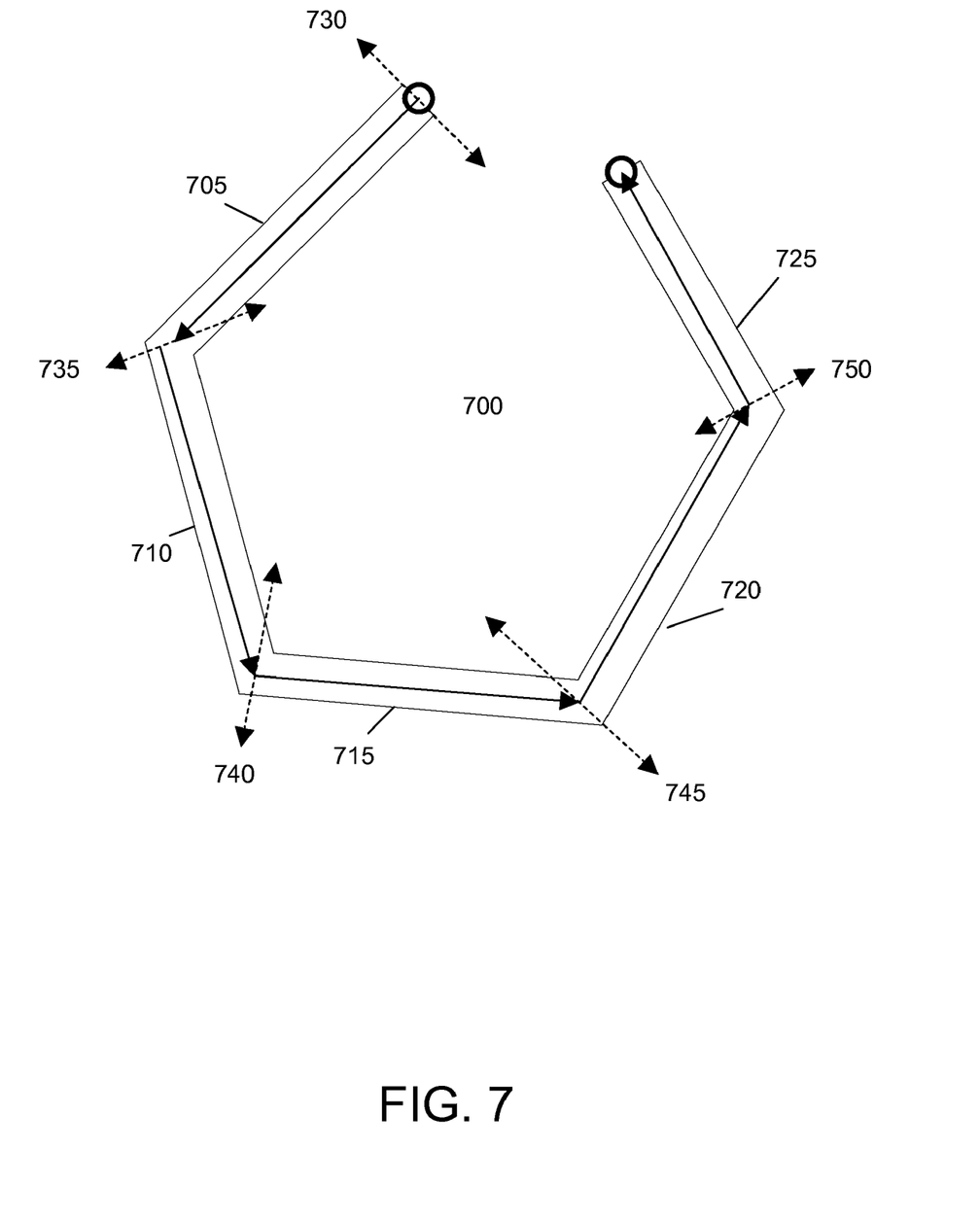
FIG. 7 illustrates determining stipple pattern values for points on a polyline according to an embodiment of the invention.

FIG. 7 illustrates determining stipple pattern values for points on a polyline according to an embodiment of the invention. A polyline is a set of connected line segments. When drawing stippled polylines, it is desirable for the stipple pattern to appear continuous between adjacent line segments. An embodiment of the invention maintains a continuous stipple pattern between adjacent line segments of a polyline. Polyline 700 includes line segments 705, 710, 715, 720, and 725. Line segments 705, 710, 715, 720, and 725 have edge equations 730, 735, 740, 745, and 750, respectively. Similar to the embodiments discussed above, evaluating a point on a line segment with the associated edge equation gives the distance from the edge equation to the point.

To maintain a continuous stipple pattern between adjacent line segments, an embodiment determines a phase offset value for each line segment after the beginning line segment. The phase offset value for a line segment is the remainder of the division of the accumulated distance along the polyline from the beginning of the line to the edge equation associated with the line segment by the stipple pattern length. For example, when the sum of the distance from edge 730 to edge 735 and from edge 735 to edge 740, is divided by the stencil pattern length, the remainder is the phase offset of segment 715.

In an embodiment, the phase offset for each line segment is computed iteratively from the phase offset of previous line segments. In this embodiment, line segment 705, being the beginning of the polyline, has a phase offset of zero. Line segment 710 has a phase offset determined from the distance from edge 730 to edge 735. For line segment 715, the phase offset is determined by the distance from edge 735 to edge 740 plus the phase offset of segment 710. Similarly, when the distance between edge 740 and edge 745 plus the phase offset of segment 715 is divided by the stipple pattern length, the remainder is the phase offset of segment 720. This computation is repeated for each line segment of the polyline. In an alternate embodiment, the phase offset is similarly computed as the remainder of the sum of the lengths of the previous line segments divided by the stipple pattern length.

To evaluate a point on a line segment of a stippled polyline, the point is evaluated in the edge associated with the line segment to determine a distance value. The phase offset for the line segment is added to the distance value of the point, and the sum is divided by the stipple pattern length to determine a remainder to use for a pattern index. The pattern index is used to apply the value of one or more pattern bits as described above to determine an aliased or antialiased point value.

As with other embodiments of the invention, the points on the stippled polyline can be evaluated in any order. Moreover, line segments of the polyline can be drawn independently and in any order. For example, line segments 705 and 750 can be drawn first, followed by line segments 710, 715, and 720. Additionally, a set of tiles can be overlaid on the stippled polyline to prevent range errors. Furthermore, different line segments or portions thereof can be drawn in parallel using different rasterization pipelines. To further parallelize stippled line drawing, the computation of phase offsets, for both segments of polylines and/or for a set of tiles, and edge equations can be determined by the setup engine of one or more rasterization pipelines.

This invention provides an efficient system and method for drawing stippled lines in any order and in parallel. Although the invention has been discussed with respect to specific examples and embodiments thereof, these are merely illustrative, and not restrictive, of the invention. Though the invention is discussed with reference to several parallel rendering schemes, the invention can be used in any application using stippled or pattern lines. Thus, the scope of the invention is to be determined solely by the claims.

The invention claimed is:

1. A method for drawing a stippled line, the method comprising:
    determining a distance function associated with the stippled line;
    evaluating the distance function for a set of points within an area of the stippled line to determine a corresponding set of distance values;
    determining a set of stipple pattern index values for the set of points, wherein each stipple pattern index value specifies a correspondence between at least one pattern bit of a stipple pattern and one of the set of points within the area of the stippled line;
    applying the values of the pattern bits of the stipple pattern specified by the set of stipple pattern index values to the corresponding ones of the set of points to determine a set of point values for the set of points: and
    displaying on a display device the stippled line with the set of determined point values applied.

2. The method of claim 1, wherein determining a distance function comprises:
    determining an edge equation associated with an end of the stippled line, such that a value of the edge equation at a point is proportional with the distance from the point to the end of the line.

3. The method of claim 2, further comprising scaling the edge equation such that the value of the edge equation at a point is the distance from the point to the end of the line in terms of pattern bits of the stipple pattern.

4. The method of claim 2, wherein the edge equation associated with the end of a line segment of the stippled line further includes a phase offset value determined from a distance along the stippled line from the end of the stippled line to the edge equation.

5. The method of claim 1, wherein determining a distance function comprises:
    determining a set of tiles each potentially including at least a portion of the stippled line;
    determining a first edge equation associated with an end of the stippled line; and
    determining, for each one of the set of tiles, a tile edge equation associated with the first edge equation, wherein the tile edge equation is associated with a phase offset value specifying the distance along the stippled line from the end of the stippled line to the edge equation.

6. The method of claim 5, wherein the corresponding set of distance values are expressed as a set of fixed point numbers, and further wherein the set of tiles each have a size chosen such that the corresponding set of distance values fall within the range of the set of fixed point numbers.

7. The method of claim 1, wherein applying the values of the pattern bits comprises:
    selectively masking the corresponding ones of the set of points according to the values of the pattern bits, thereby selecting a portion of the set of points to be displayed.

8. The method of claim 7, further comprising applying a line color to the portion of the set of points.

9. The method of claim 1, wherein applying the values of the pattern bits comprises:
    determining a set of pattern bit weights for the pattern bits specified by the stipple pattern index value corresponding to one of the set of points according to the position of the point within the stipple pattern; and
    determining an intensity value of the one of the set of points from the set of pattern bit weights.

10. The method of claim 9, wherein determining an intensity value comprises determining a weighted average of the values of the pattern bits according to the set of pattern bit weights.

11. The method of claim 1, wherein the set of points correspond to a set of pixels at least partially within the boundaries of the stippled line.

12. The method of claim 1, wherein the set of points correspond to a set of sub-pixel samples at least partially within the boundaries of the stippled line.

13. The method of claim 1, wherein the steps of evaluating the distance function, determining a set of stipple pattern index values, and applying the values of the pattern bits are performed on the set of points in a rasterization order.

14. A graphics processing subsystem adapted to output a set of pixels corresponding with a geometric primitive defining a stippled line, the graphics processing adapted to perform the steps of:
    determining a distance function associated with the stippled line;
    evaluating the distance function for a set of points within the area of the stippled line to determine a corresponding set of distance values;
    determining a set of stipple pattern index values for the set of points, wherein each stipple pattern index value specifies a correspondence between at least one pattern bit of a stipple pattern and one of the set of points within the area of the stippled line;
    applying the values of the pattern bits of the stipple pattern specified by the set of stipple pattern index values to the corresponding ones of the set of points to determine a set of point values for the set of points; and
    outputting to a display device, pixel data for displaying the stippled line with the set of determined point values applied.

15. The graphics processing subsystem of claim 14, wherein in determining the distance function associated with the stippled line, the graphics processing unit is adapted to determine an edge equation associated with an end of the stippled line, such that a value of the edge equation at a point is proportional with the distance from the point to the end of the line.

16. The graphics processing subsystem of claim 15, further adapted to scale the edge equation such that the value of the edge equation at a point is the distance from the point to the end of the line in terms of pattern bits of the stipple pattern.

17. The graphics processing subsystem of claim 14, wherein the edge equation passes through a line segment of the stippled line and the distance function further includes a phase offset value specifying the distance along the stippled line from the end of the stippled line to the edge equation.

18. The graphics processing subsystem of claim 14, wherein determining a distance function comprises:
    determining a set of tiles each potentially including at least a portion of the stippled line;
    determining a first edge equation associated with an end of the stippled line; and
    determining, for each one of the set of tiles, a tile edge equation associated with the first edge equation, wherein the tile edge equation is associated with a phase offset value specifying the distance along the stippled line from the end of the stippled line to the edge equation.

19. The graphics processing subsystem of claim 17, wherein the corresponding set of distance values are expressed as a set of fixed point numbers, and further wherein the set of tiles each have a size chosen such that the corresponding set of distance values fall within the range of the set of fixed point numbers.

20. The graphics processing subsystem of claim 14, wherein applying the values of the pattern bits comprises:
    selectively masking the corresponding ones of the set of points according to the values of the pattern bits, thereby selecting a portion of the set of points to be displayed.

21. The graphics processing subsystem of claim 20, further adapted to apply a line color to the portion of the set of points.

22. The graphics processing subsystem of claim 14, wherein applying the values of the pattern bits comprises:
    determining a set of pattern bit weights for the pattern bits specified by the stipple pattern index value corresponding to one of the set of points according to the position of the point within the stipple pattern; and
    determining an intensity value of the one of the set of points from the set of pattern bit weights.

23. The graphics processing subsystem of claim 22, wherein determining an intensity value comprises determining a weighted average of the values of the pattern bits according to the set of pattern bit weights.

24. The graphics processing subsystem of claim 14, wherein the set of points correspond to a set of sub-pixel samples at least partially within the boundaries of the stippled line.

25. The graphics processing subsystem of claim 14, further including a plurality of rasterization pipelines adapted to perform the steps of evaluating the distance function, determining a set of stipple pattern index values, and applying the values of the pattern bits in parallel for at least a portion of the set of points.

26. A method for drawing a stippled line, the method comprising:
- determining a distance function associated with the stippled line;
- evaluating the distance function for a set of points within an area of the stippled line to determine a corresponding set of distance values;
- determining a set of stipple pattern index values for the set of points, wherein each stipple pattern index value specifies a correspondence between at least one pattern bit of a stipple pattern and one of the set of points within the area of the stippled line;
- applying the values of the pattern bits of the stipple pattern specified by the set of stipple pattern index values to the corresponding ones of the set of points to determine a set of point values for the set of points; and
- displaying on a display device the stippled line with the set of determined point values applied;
- wherein determining a distance function comprises determining an edge equation associated with an end of the stippled line and scaling the edge equation by a pattern scaling factor to alter an apparent length of the stipple pattern.

27. A graphics processing subsystem adapted to output a set of pixels corresponding with a geometric primitive defining a stippled line, the graphics processing adapted to perform the steps of:
- determining a distance function associated with the stippled line;
- evaluating the distance function for a set of points within the area of the stippled line to determine a corresponding set of distance values;
- determining a set of stipple pattern index values for the set of points, wherein each stipple pattern index value specifies a correspondence between at least one pattern bit of a stipple pattern and one of the set of points within the area of the stippled line;
- applying the values of the pattern bits of the stipple pattern specified by the set of stipple pattern index values to the corresponding ones of the set of points to determine a set of point values for the set of points; and
- outputting to a display device, pixel data for displaying the stippled line with the set of determined point values applied;
- wherein determining a distance function comprises determining an edge equation associated with an end of the stippled line and scaling the edge equation by a pattern scaling factor to alter an apparent length of the stipple pattern.

* * * * *